Figure 1:
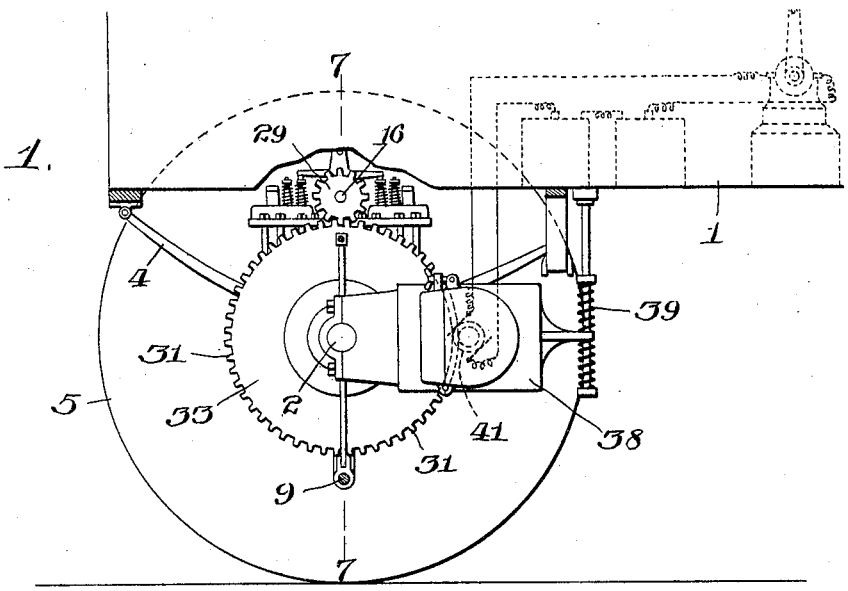

No. 653,855.  
V. V. TORBENSEN.  
MOTOR VEHICLE.  
(Application filed Dec. 2, 1899.)  
Patented July 17, 1900.

(No Model.)  
5 Sheets—Sheet 1.

WITNESSES:  
John R. Nolan  
C. E. Parker

INVENTOR  
Viggo V. Torbensen  
By  
ATTORNEY

No. 653,855. Patented July 17, 1900.
V. V. TORBENSEN.
MOTOR VEHICLE.
(Application filed Dec. 2, 1899.)
(No Model.) 5 Sheets—Sheet 2.

WITNESSES:

INVENTOR
Viggo V. Torbensen
ATTORNEY

No. 653,855. Patented July 17, 1900.
V. V. TORBENSEN.
MOTOR VEHICLE.
(Application filed Dec. 2, 1899.)
(No Model.) 5 Sheets—Sheet 3.

WITNESSES
INVENTOR
Viggo V. Torbensen
BY
ATTORNEY

No. 653,855. Patented July 17, 1900.
V. V. TORBENSEN.
MOTOR VEHICLE.
(Application filed Dec. 2, 1899.)

(No Model.) 5 Sheets—Sheet 4.

WITNESSES: INVENTOR
John R. Nolan Viggo V. Torbensen
C. E. Parker BY
ATTORNEY

No. 653,855. Patented July 17, 1900.
V. V. TORBENSEN.
MOTOR VEHICLE.
(Application filed Dec. 2, 1899.)
(No Model.) 5 Sheets—Sheet 5.

WITNESSES:
John R. Nolan
C. E. Parker

INVENTOR
Viggo V. Torbensen
BY
H. V. Heulon
ATTORNEY

UNITED STATES PATENT OFFICE.

VIGGO V. TORBENSEN, OF BLOOMFIELD, NEW JERSEY, ASSIGNOR TO GEORGE T. HARRIS, OF PHILADELPHIA, PENNSYLVANIA.

MOTOR-VEHICLE.

SPECIFICATION forming part of Letters Patent No. 653,855, dated July 17, 1900.

Application filed December 2, 1899. Serial No. 738,969. (No model.)

*To all whom it may concern:*

Be it known that I, VIGGO V. TORBENSEN, a citizen of the United States, residing at Bloomfield, in the county of Essex and State of New Jersey, have invented certain new and useful Improvements in Motor-Vehicles, of which the following is a full, clear, and exact description, reference being had to the accompanying drawings, forming a part of this specification.

This invention relates to that class of motor-carriages in which an internal-combustion engine is used as the motor, my object, primarily, being to provide a simple and efficient construction and arrangement of engine whereby the excessive vibrations heretofore imparted to the body of the vehicle by the pulsation of the engine shall be obviated; secondly, to provide an engine which shall be compact, self-contained, and mounted wholly on the driving-axle of the carriage; thirdly, to provide a novel system of differential-speed gearing between the engine and the axle whereby the transmission of the power from the former to the latter shall be direct whether the high or the low speed be in operation, and, fourthly, to combine with the engine an electric motor and its complementary parts in such a manner that the engine may be used not only to propel the carriage, but to actuate the motor as an electric generator, or, instead, the motor may be used to drive the engine as well as the vehicle, or, again, the power of the motor may be advantageously combined with that of the engine to propel the vehicle, as the various requirements may demand.

A further object is to maintain the several gears in absolute parallelism relative to each other.

I obtain these objects by the mechanism illustrated in the accompanying drawings, in which—

Figure 2:
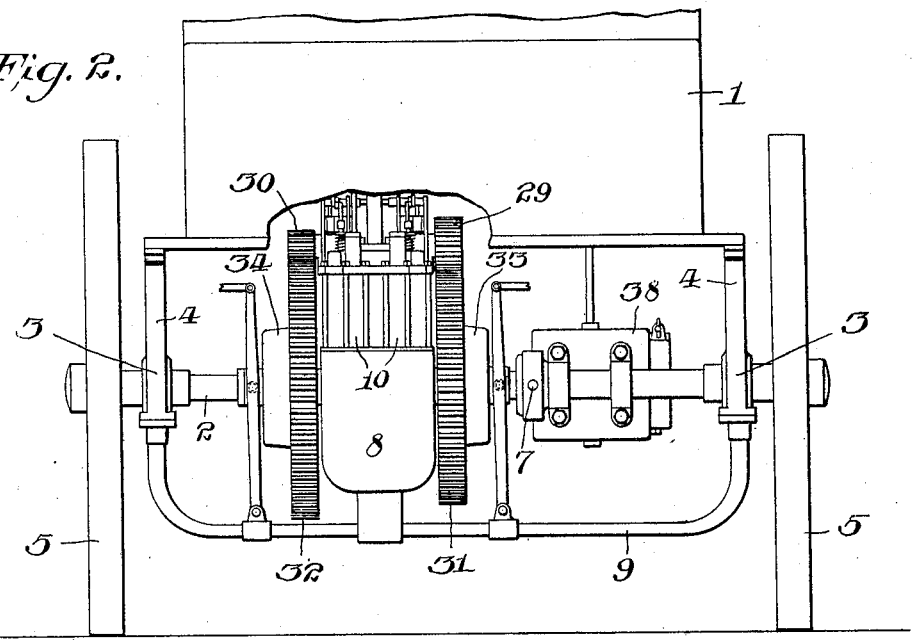
Figure 3:
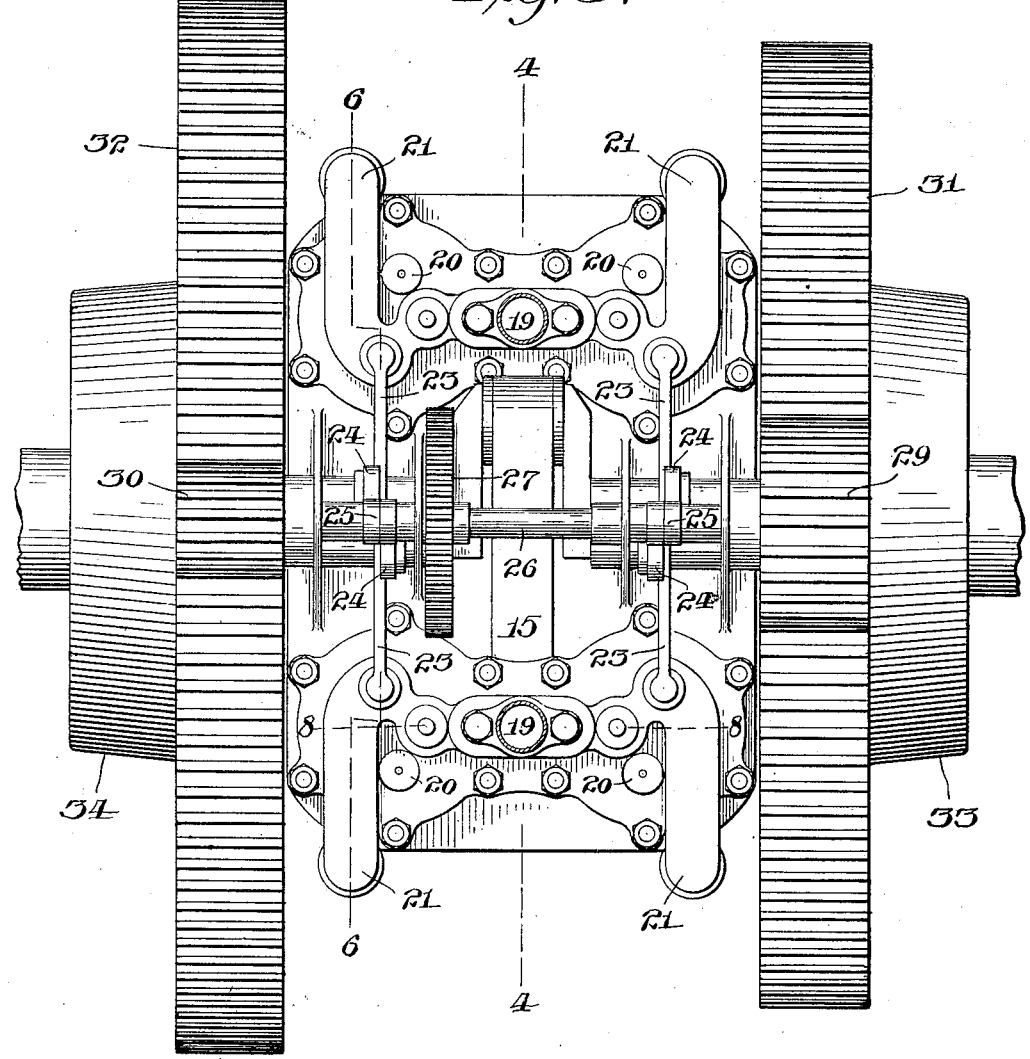
Figure 4:
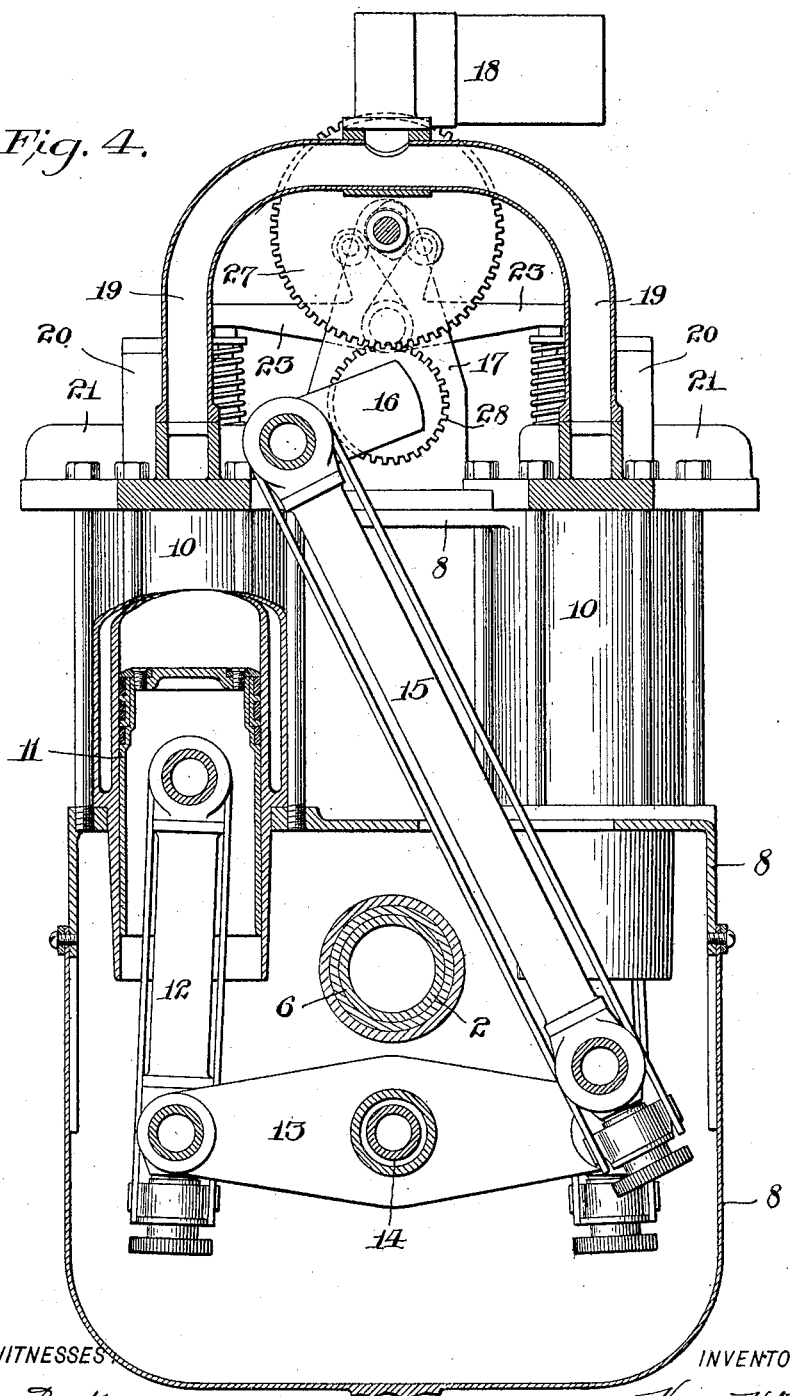
Figure 5:
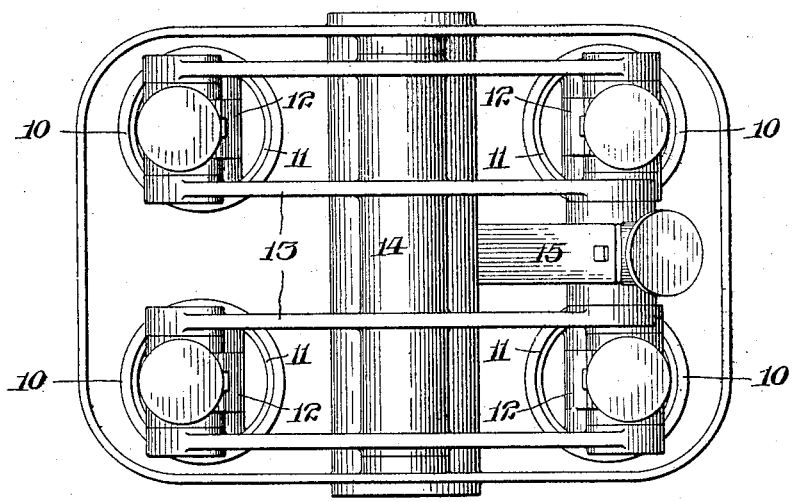
Figure 6:
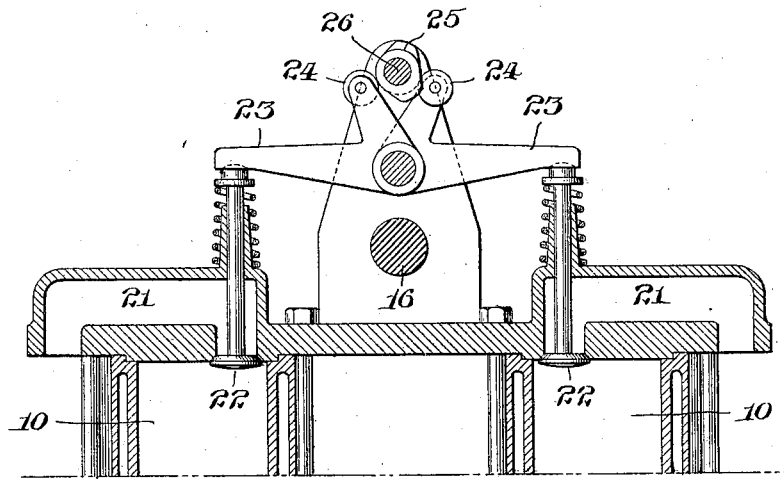
Figure 7:
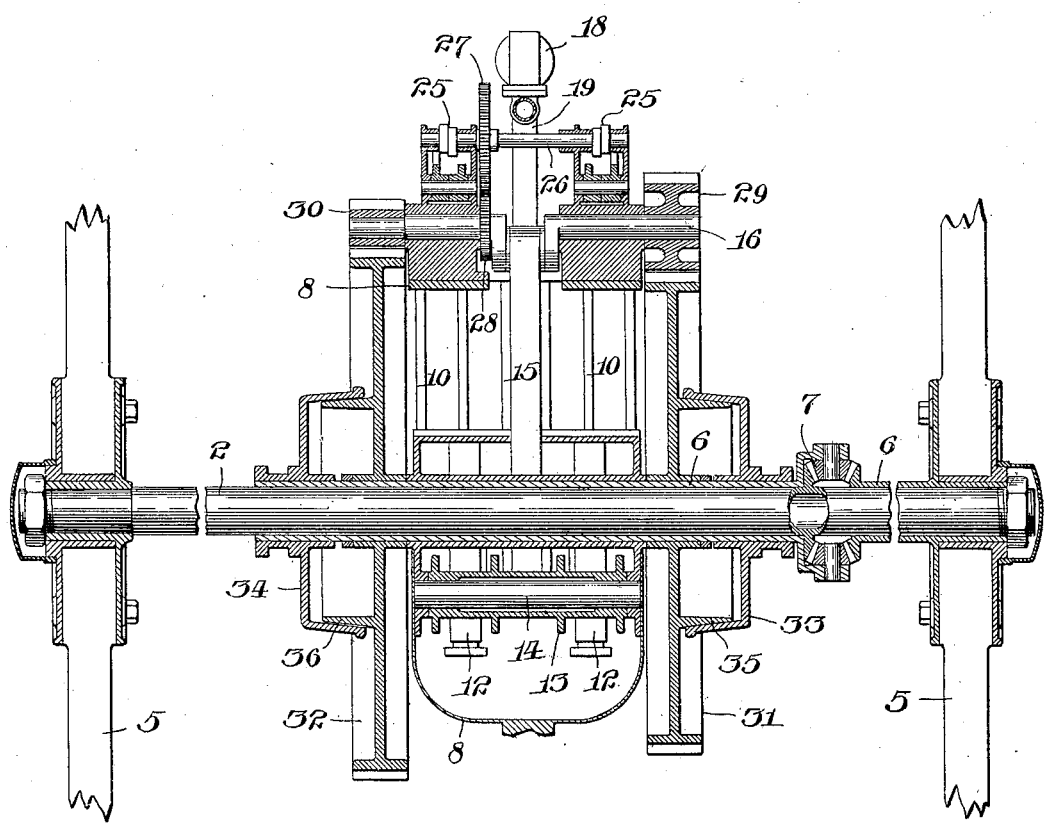
Figure 8:
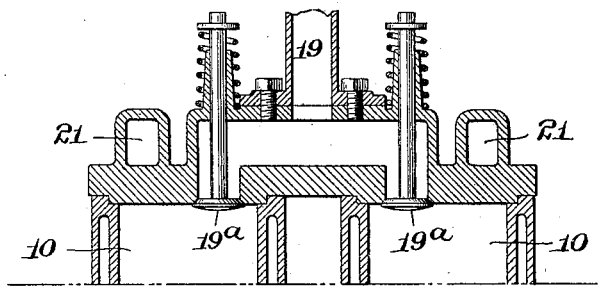

Figure 1 is an elevation of a portion of a vehicle embodying my invention. Fig. 2 is an end view thereof. Fig. 3 is a sectional plan of the engine and the driving-gearing. Fig. 4 is a vertical section on the line 4 4 of Fig. 3, including the vaporizer and the feed-pipes therefrom to the engine-cylinders. Fig. 5 is a bottom view of Fig. 4 with part of the casing removed. Fig. 6 is a sectional detail of two opposite cylinders, showing the exhaust-valves and actuating means therefor as on the line 6 6 of Fig. 3. Fig. 7 is a transverse vertical section as on the line 7 7 of Fig. 1. Fig. 8 is a sectional detail of a pair of cylinders, showing the inlet-valves therefor on the line 8 8 of Fig. 3.

1 indicates the body of the carriage, and 2 the driving-axle thereof, the latter having its bearings in boxes 3, supported by semi-elliptical springs 4, affixed to the carriage-body. The carrying-wheels 5 are mounted on the axle in the usual manner, so as to be rotatable at relatively-different speeds in turning curves, &c., the axle including in its construction the bushings 6 and the coacting coupling-gears 7. Mounted on the axle is the supporting-frame 8 of an internal-combustion engine, which frame, with its appurtenances, is prevented from turning about the axle by means of a brace-bar 9, which is secured thereto and to the spring-supported boxes 3.

The engine herein illustrated embodies four vertical cylinders 10, arranged in pairs, whereof one pair is disposed on one side of the axle and the other pair directly opposite thereto on the other side of the axle. The pistons 11 of the respective cylinders are connected by means of their rods 12 with the arms of a common walking-beam 13, the shaft 14 of which has its bearings in the sides of the supporting-frame. This beam is connected by means of a rod 15 with an overlying crank-shaft 16, which is journaled in suitable boxes 17 on the top of the cylinders, whereby when the engine is driven motion is transmitted therefrom to said shaft. This shaft is geared by differential-speed gearing with the driving-axle of the carriage, as will be hereinafter explained.

18 is the usual vaporizer to which the oil is fed and therein vaporized preparatory to its passage to the engine-cylinders during the down or suction strokes of their pistons 11. 19 19 are the feed-pipes leading from said vaporizer to the respective cylinders, and 19ᵃ 19ᵃ are the spring-controlled inlet-valves which control the communication between said pipes and cylinders. These valves open inward during the suction-stroke of the pistons, but resume their seat preparatory to and during the reverse stroke of the pistons. 20 20 are the ignition-tubes, arranged upon said cylinders and adapted to ignite the gaseous charges therein. As the vaporizer and the ignition-tubes may be of usual and well-known construction and operation, no detailed description or illustration thereof is deemed necessary in this connection.

21 21 are the exhaust-ports in the respective cylinders, and 22 22 the spring-controlled valves therefor. Bearing upon the stems of these valves are the longer arms of crank-levers 23, the shorter arms of which are provided with antifriction-rollers 24, that bear against suitably-disposed cams 25 on a shaft 26. This shaft is provided with a spur-wheel 27, which is geared with a pinion 28 on the crank-shaft 16, whereby during the rotation of the latter the cam-shaft 26 is driven and the cams thereon effect the actuation of the coacting levers in a manner to control the operation of the exhaust-valves in respect to the reciprocations of the respective pistons.

The engine above described works on the four-cycle plan, the operation thereof being such that an explosion or impulse occurs at every stroke. The explosion in a cylinder of one pair is always opposed by the compression in a cylinder of the opposite pair, the power impulse thus being first on one side of the axle and then on the other side thereof, and so on in alternate succession. Consequently the whole force of the explosion is initially one-fourth of that where a single cylinder is used, and a large part of such force is taken up directly by the compression in the opposing cylinder, thus leaving but a small part of the work to be consumed in vibration.

By the construction described all the cylinders work on a common crank, thus materially simplifying and reducing the cost and weight of the structure.

On the respective ends of the crank-shaft are keyed pinions 29 30, that coact with spur-wheels 31 32, respectively, loosely mounted on the elongated bushing 6 of the driving-axle. The pinions and their respective spur-wheels are of relatively-different diameters, so that by the locking of either of the spur-wheels to the axle the latter may be driven at a relatively high or low rate of speed, as desired.

Splined on the bushing adjacent to the outer faces of the respective spur-wheels are independently-movable clutch members 33 34, which are adapted to be engaged with and disengaged from corresponding members 35 36, fast on the opposing faces of said wheels, thereby rendering said wheels fast or loose on the bushing, as occasion may require. Each of the movable members has connected thereto a hand-lever 37, whereby it may be readily controlled. From the foregoing it will be seen that the crank-shaft is geared directly with the axle and that by properly adjusting one or the other of the clutches a high gear may be had for ordinary driving on level roads or a low gear for hill-climbing and for starting in difficult places.

Mounted on the axle is one end of an electric motor 38, the opposite end of which is suspended from the body of the vehicle by a spring 39. On the armature-shaft 40 of the motor is a pinion 41, which is geared permanently to the high-gear wheel 31 on the axle, to the end that the motor will be driven at a uniform rate of speed by the engine irrespective of the speed of the carriage. Arranged on the carriage is a series of electric storage batteries 42, which are electrically connected together and with the motor by the conductors 43. A suitable switch 44 is provided whereby the circuit to the motor may be made or broken, as desired, and whereby the batteries may be disconnected from each other or coupled together to meet the requirements of service.

Preparatory to starting the engine I manipulate the switch to direct the current from the storage batteries to and through the motor, so as to impart to the latter a few revolutions, and thereby, through the gearing, impel the engine. This being done, the engine starts and its speed increases, and in consequence the counter electromotive force overcomes that due to the batteries, and the motor thereupon acts as a generator and recharges the batteries.

The engine is the driving power. The electric motor is the auxiliary therefor. When it is necessary to ascend a heavy grade requiring a momentary increase of power, the series of batteries may by proper manipulation of the switch be coupled together to increase the electromotive force, in which case the driving power from the motor will be added to that of the engine, thereby insuring a very large surplus of power.

If it be desired to run the carriage backward, I stop the engine entirely, reverse the circuit in the motor-armature, and throw in the low-gear clutch. Thereupon the electric motor drives the carriage backward through the power transmission from the armature to the crank-shaft, the described system of gearing affording powerful leverage for the motor. Obviously by the construction and organization of parts hereinbefore described the several gears are maintained in absolute parallelism relative to each other.

I claim—

1. In a motor-vehicle, the combination with the driving-axle, of an engine mounted thereon including a supporting-frame, two series of cylinders whereof one series is disposed on one side of the axle and the other series directly opposite thereto on the other side of the axle, the pistons in said cylinders, a driving-shaft, operative connections between the same and said pistons, and operative connections between said shaft and the axle, substantially as described.

2. In a motor-vehicle, the combination with the driving-axle, of an engine mounted thereon including a supporting-frame, two series of cylinders whereof one series is disposed on one side of the axle and the other series directly opposite thereto on the other side of the axle, the pistons in said cylinder, a driving-shaft, operative connections between the same and said pistons, and differential-speed gearing between said shaft and the axle, substantially as described.

3. In a motor-vehicle, the combination with the driving-axle, of an internal-combustion engine thereon including a supporting-frame, four cylinders arranged in pairs whereof one pair is disposed on one side of the axle and the other pair directly opposite thereto on the other side of the axle, the pistons in said cylinders, a common walking-beam mounted on the frame, operative connections between said beam and the pistons, a driving-shaft, operative connections between the same and the walking-beam, and gearing between said driving-shaft and the axle, substantially as described.

4. In a motor-vehicle, the combination with the driving-axle, of an internal-combustion engine of the character described mounted thereon, said engine including a supporting-frame, two series of cylinders whereof one series is disposed on one side of the axle and the other series directly opposite thereto on the other side of the axle, a vaporizer, feed-pipes leading therefrom to the respective cylinders, inlet-valves for controlling the communication between said pipes and cylinders, valved exhaust-ports in the respective cylinders, ignition means for said cylinders, the pistons, a driving-shaft, operative connections between the same and the pistons, and means for relatively operating the valves of the exhaust-ports, together with gearing between said driving-shaft and the axle, substantially as described.

5. In a motor-vehicle, the combination with the driving-axle, of an engine and an electromotor supported on said axle, differential-speed gearing between said engine and the driving-axle, and a gear on the armature-shaft coacting with said speed-gearing, substantially as described.

6. In a motor-vehicle, the combination with the driving-axle, of an engine supported on said axle, a driving-shaft operatively connected with and driven by said engine, differential-speed gearing between said shaft and axle, an electric motor, a source of electric supply therefor, and gearing between said motor and the gearing first named, substantially as described.

7. In a motor-vehicle, the combination with the driving-axle, of an engine, a driving-shaft operatively connected with and driven by said engine, pinions fast on said shaft, coacting spur-wheels on the axle, said pinions and spur-wheels being of relatively-different diameters as described, means whereby said spur-wheels may be rendered fast or loose on the axle, an electric motor, a pinion on the armature-shaft thereof geared to the high-speed spur-wheel on the axle, and a source of electric supply for said motor, substantially as described.

8. In a motor-vehicle, the combination with the driving-axle, and its spring-supported boxes, of an engine of the character described whereof the frame is supported on said axle, a brace-bar secured to said frame and to the boxes, a driving-shaft impelled by said engine, differential gearing between said shaft and the axle, an electric motor one end of which is hung on the axle and the other end is flexibly suspended from the vehicle-body, a pinion on the armature-shaft of the motor geared with said differential gearing, a source of electric energy on the vehicle electrically connected with the motor, and current-controlling means, substantially as described.

In testimony whereof I have hereunto affixed my signature this 17th day of October, A. D. 1899.

VIGGO V. TORBENSEN.

Witnesses:
ARTHUR RUSSELL,
JAS. E. IRWIN.